Sept. 17, 1935.    W. PEINEKE ET AL    2,014,585
PLAIN BEARING
Original Filed Sept. 21, 1931
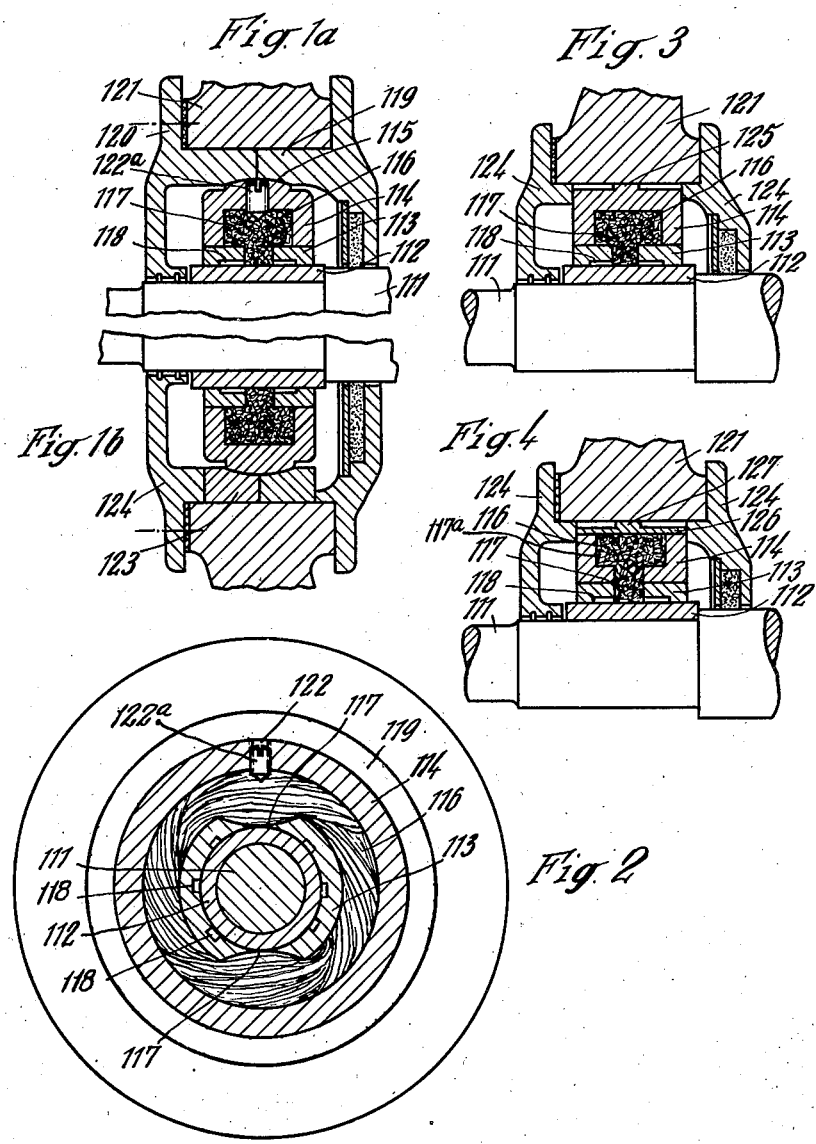

Patented Sept. 17, 1935

2,014,585

UNITED STATES PATENT OFFICE 2,014,585

PLAIN BEARING

Wilhelm Peineke, Berlin, Karl Reschke, Berlin-Siemensstadt, and Hans Dietzius, Berlin-Charlottenburg, Germany, assignors to Siemens-Schuckertwerke Aktiengesellschaft, Berlin-Siemensstadt, Germany, a corporation of Germany Original application September 21, 1931, Serial No. 564,062. Divided and this application May 5, 1934, Serial No. 724,026. In Germany April 11, 1931

2 Claims. (Cl. 308—121)

Our invention relates to a plain bearing which may be substituted for an anti-friction bearing without modifying the bearing housing and which is lubricated by a wick arranged around the shaft. The invention refers in particular to certain modifications of this type of convertible bearing, originally disclosed in our copending application Serial No. 564,062, filed September 21, 1931, of which the present application is a division.

According to our invention a particularly simple design of the plain bearing may be attained by arranging the wick in a preferably channelled ring carrying the shaft. The advantage of this arrangement consists in the fact that the bearing is ready for service in every position because the oil always remains in the lubricating wick and cannot accumulate outside the latter in certain positions of the wick. Thus all of the oil is bound to be conducted to the running surfaces of the bearing.

The annular body can be formed like a calotte on the outside or it can have a corresponding projection for providing simple adjustment of the bearing and to prevent pressure where it is not wanted. This type of bearing, therefore, offers free adjustment of the bearing whereas with normal plain bearings, high pressures can easily occur.

The invention is illustrated in the accompanying drawing in which

Figs. 1a and 1b each represent a longitudinal section through one-half of the bearing, Fig. 1b showing a slight modification of the bearing support over Fig. 1a;

Fig. 2 represents a central transverse section through the bearing Fig. 1a, and

Figs. 3 and 4 each represent a longitudinal section through one-half of a modified bearing construction.

Referring to Figs. 1a and 2, on a shaft 111 is disposed a sleeve 112 of hard material, e. g. steel, cast iron, hardened bronze, etc. The ring is journalled in a sleeve 113 which is surrounded by an annular, channelled carrier 114 with a U-shaped cross-section. Outside the carrier has a calotte-shaped ridge 115. Carrier 114 contains lubricating wick 116 which comes into contact with the running surface of the shaft sleeve by way of the recesses 117 of bearing sleeve 113, the actual contact being with sleeve 112 on the shaft which is thus lubricated. In order to guarantee uniform lubrication of the whole running surface, longitudinally directed lubricating recesses 118 are provided in sleeve 113.

At one point of its circumference the carrier 114 has a bore 122 which is closed by a screw plug 122a and is used for introducing oil and for inserting and removing the lubricating wick 116. The screw plug closing opening 122 is best made to project a little inwardly from the wall of carrier 114 as shown in order to prevent the lubricating wick 116 from following the rotation of the shaft. The carrier 114 is surrounded by a transversely split casing 119 which, as shown in Fig. 1a, has flanges 120 on the outer sides with which the two casing halves can be attached to the bearing bracket 121 of an electric motor or to the bearing bracket of any other machine in which they serve. Instead of the split casing 119 serving directly for the support of the carrier 114 it is also possible, as shown in Fig. 1b, to surround the carrier 114 by one or two rings 123 which are held in position by covers 124 such as are used for ball bearings.

The free alining movement of the bearing can also be obtained by providing the outer periphery of carrier 114 with a smooth rim 125 as shown in Fig. 3. If there is no special casing provided, such as is shown, for instance, at 119 in Fig. 1a, this rim rests against the cylindrical recess of bracket 121 so that in view of the narrow resting surface of rim 125 easy adjustability of the bearing is rendered possible.

As will be seen in Fig. 4 the groove in carrier 114 serving for accommodating the lubricating wick 116 can be outside in which case the carrier is surrounded by a sleeve 126 which again is provided with a narrow rim 127. In order to provide with such a carrier form contact for the wick with the shaft bearing surface, also in this case tne bearing sleeve 113 is provided with one or several peripheral cut away portions 117 similar to those shown at 117 in Fig. 2, and in addition the bottom of the groove in carrier 114 is provided with similar cut away portions 117a, each of which registers with a recess 117 in sleeve 113 as shown in Fig. 4.

As carrier 114 has a great deal of play in the opening of the bracket due to the calotte surface 115 of Fig. 1 or the rims 125 and 127 of Figs. 3 and 4, shaft 111 can easily aline itself so that no impermissible side pressures manifest themselves at the two ends of the bearing. The bearing as described herein is, therefore, peculiarly adapted for electric motors whose shafts call for a certain adjustment especially when a bolt pulley is provided.

We claim as our invention:

1. In a bearing, convertible from a ball bearing into a plain bearing, in combination, a shaft, a bearing housing having a bore adapted to receive a plain bearing or a similar size ball bearing, a channelled ring removably disposed in said housing, and a bushing of bearing metal within said ring, said bushing having a recess extending to the surface of said shaft, said ring having its open side presented to said bushing, and having an annular rib on its outer surface lying against said housing to secure radial alinement of the shaft, a wick housed in said ring and contacting with the shaft through said recess, and lateral lids secured against the sides of the housing for closing the bearing and for holding said ring in position.

2. In a bearing, convertible from a ball bearing into a plain bearing, in combination, a shaft, a bearing housing having a bore adapted to receive a plain bearing or a similar size ball bearing, a channelled ring of bearing metal disposed in said bore and serving as a plain bearing, a bushing for said shaft, said ring having a recess extending through its inner surface to said shaft, a wick housed in said ring and contacting with the shaft through said recess, a sleeve for closing the open portion of said channelled ring, said sleeve having an outer peripheral ridge serving as a centering and alining element for the ring and the bearing in said housing, and cover plates on both sides of the channelled ring for holding said ring in the housing.

WILHELM PEINEKE.
KARL RESCHKE.
HANS DIETZIUS.